US007675925B2

(12) United States Patent
Jones

(10) Patent No.: US 7,675,925 B2
(45) Date of Patent: *Mar. 9, 2010

(54) METHOD AND APPARATUS FOR PROVIDING A PACKET BUFFER RANDOM ACCESS MEMORY

(75) Inventor: David E. Jones, Ottawa (CA)

(73) Assignee: MOSAID Technologies Incorporated, Ottawa, Ontario (CA)

(*) Notice: Subject to any disclaimer, the term of this patent is extended or adjusted under 35 U.S.C. 154(b) by 1132 days.

This patent is subject to a terminal disclaimer.

(21) Appl. No.: 10/614,558

(22) Filed: Jul. 7, 2003

(65) Prior Publication Data
US 2004/0008714 A1    Jan. 15, 2004

Related U.S. Application Data

(63) Continuation of application No. 09/283,778, filed on Mar. 31, 1999, now Pat. No. 6,590,901.

(60) Provisional application No. 60/080,362, filed on Apr. 1, 1998.

(51) Int. Cl.
*H04L 12/28* (2006.01)
*H04L 12/54* (2006.01)

(52) U.S. Cl. ........................ 370/412; 370/429

(58) Field of Classification Search ......... 370/411–419, 370/428, 429, 235; 711/100
See application file for complete search history.

(56) References Cited

U.S. PATENT DOCUMENTS

| 4,612,634 | A |   | 9/1986  | Bellamy |
|-----------|---|---|---------|---------|
| 4,891,795 | A | * | 1/1990  | Pinkham et al. ........ 365/230.03 |
| 4,947,373 | A | * | 8/1990  | Yamaguchi et al. .... 365/189.04 |
| 5,187,795 | A | * | 2/1993  | Balmforth et al. ............. 712/38 |
| 5,440,523 | A | * | 8/1995  | Joffe ..................... 365/230.05 |
| 5,475,680 | A | * | 12/1995 | Turner ......................... 370/412 |
| 5,612,925 | A | * | 3/1997  | Toda et al. ................... 365/236 |
| 5,694,143 | A |   | 12/1997 | Fielder et al. |
| 5,703,822 | A | * | 12/1997 | Ikeda ......................... 365/221 |
| 5,815,723 | A |   | 9/1998  | Wilkinson et al. |
| 5,859,849 | A | * | 1/1999  | Parks .................... 370/395.72 |
| 5,867,735 | A | * | 2/1999  | Zuravleff et al. ............. 710/52 |
| 5,875,486 | A | * | 2/1999  | Toda et al. ................... 711/167 |
| 5,917,760 | A |   | 6/1999  | Millar |
| 5,945,886 | A |   | 8/1999  | Millar |
| 6,112,287 | A |   | 8/2000  | Litaize et al. |
| 6,295,299 | B1 | * | 9/2001 | Haddock et al. ............ 370/423 |
| 6,345,321 | B1 |   | 2/2002  | Litaize et al. |

\* cited by examiner

*Primary Examiner*—Hong Cho
*Assistant Examiner*—Hicham B Foud
(74) *Attorney, Agent, or Firm*—Hamilton, Brook, Smith & Reynolds, P.C.

(57) ABSTRACT

The present invention generally provides a packet buffer random access memory (PBRAM) device including a memory array, a plurality of input ports, and a plurality of serial registers associated with the input ports. The plurality of input ports permit multiple devices to concurrently access the memory in a non-blocking manner. The serial registers enable receiving data from the input ports and concurrently packet data to the memory array. The memory performs all management of network data queues so that all port requests can be satisfied within the real-time constraints of network packet switching.

17 Claims, 16 Drawing Sheets

FIG. 4 *PRIOR ART*

| CMDF | 7 | 6 | 5 | 4 | 3 | 2 | 1 | 0 |
|---|---|---|---|---|---|---|---|---|
| 0 | 0 | 0 | 0 | \multicolumn{5}{c}{Port ID} |
| 0 | 0 | A | F | P | \multicolumn{4}{c}{Queue HI} |
| 1 | \multicolumn{8}{c}{Queue LO} |

Port ID: The address of the port to return data on(0-31).

A: Abort flag
F: Free flag
P: Peek flag

Queue HI, queue LO: bits 11-8 and 7-0 of the queue descriptor, respectively.

Read Data Command

FIG. 13

| CMDF | 7 | 6 | 5 | 4 | 3 | 2 | 1 | 0 |
|---|---|---|---|---|---|---|---|---|
| 0 | 0 | 1 | 0 | \multicolumn{5}{c}{Port ID} |
| 1 | 0 | 0 | F | \multicolumn{5}{c}{Delay} |

Port ID: The address of the port to return data on(0-31).

Suspend Output Command

FIG. 14

Assign Queue Command

Assign Tag Command

Assign Length Command

Commit Command

Write Abort Command

| CMDF | 7 | 6 | 5 | 4 | 3 | 2 | 1 | 0 |
|---|---|---|---|---|---|---|---|---|
| 0 | 0 | 1 | 1 | 0 | 0 | 0 | 0 | 0 |
| 0 | 0 | 0 | 0 | 0 | Source queue HI ||||
| 0 | Source queue LO ||||||||
| 0 | 0 | 0 | 0 | 0 | Dest. queue HI ||||
| 1 | Dest. queue LO ||||||||

Transfer Command

FIG. 20

| CMDF | 7 | 6 | 5 | 4 | 3 | 2 | 1 | 0 |
|---|---|---|---|---|---|---|---|---|
| 0 | 0 | 1 | 1 | 0 | 0 | 0 | 0 | 1 |
| 0 | 0 | 0 | 0 | 0 | Source queue HI ||||
| 1 | Source queue LO ||||||||

Drop Data Command

FIG. 21

The "drop data" command removes the packet at the head of the specified queue, and frees the memory.
This command is useful in cases of congestion.

4.3.3 Flush Queue

| CMDF | 7 | 6 | 5 | 4 | 3 | 2 | 1 | 0 |
|---|---|---|---|---|---|---|---|---|
| 0 | 0 | 1 | 1 | 0 | 0 | 0 | 1 | 0 |
| 0 | 0 | 0 | 0 | 0 | Source queue HI ||||
| 1 | Source queue LO ||||||||

Flush Queue Command

FIG. 22

| CMDF | 7 | 6 | 5 | 4 | 3 | 2 | 1 | 0 |
|---|---|---|---|---|---|---|---|---|
| 0 | 0 | 1 | 1 | 1 | 1 | 1 | 1 | 1 |
| 1 | R | 0 | 0 | 0 | 0 | 0 | 0 | 0 |

Reset Command

FIG. 23

| CMDF | 7 | 6 | 5 | 4 | 3 | 2 | 1 | 0 |
|---|---|---|---|---|---|---|---|---|
| 1 | 1 | 1 | 1 | 1 | 1 | 1 | 1 | 1 |

No-Op Command

FIG. 24

| CMDF | 7 | 6 | 5 | 4 | 3 | 2 | 1 | 0 |
|---|---|---|---|---|---|---|---|---|
| 1 | 1 | 1 | 1 | 0 | Option | | | |

Test Command

FIG. 25

| CMDF | 7 | 6 | 5 | 4 | 3 | 2 | 1 | 0 |
|---|---|---|---|---|---|---|---|---|
| 0 | 1 | 0 | 0 | 0 | 0 | 0 | 0 | 0 |
| 1 | 0 | Buffer Size | | | 0 | Buffer Count | | |

Set Chip Count Command

FIG. 26

| CMDF | 7 | 6 | 5 | 4 | 3 | 2 | 1 | 0 |
|---|---|---|---|---|---|---|---|---|
| 0 | 1 | 0 | 0 | 0 | 0 | 0 | 0 | 1 |
| 1 | 0 | Packet Size | | | B | Tag Length | | |

Set Tag Length Command

FIG. 27

| CMDF | 7 | 6 | 5 | 4 | 3 | 2 | 1 | 0 |
|---|---|---|---|---|---|---|---|---|
| 0 | 1 | 1 | 0 | Port | | | | |
| 1 | ENC | QS | QSC | Chip ID | | | | |

Timing Reference Command

FIG. 28

| CMDF | 7 | 6 | 5 | 4 | 3 | 2 | 1 | 0 |
|---|---|---|---|---|---|---|---|---|
| 0 | 1 | 0 | 1 | Port | | | | |
| 0 | 0 | 0 | 0 | Chip ID | | | | |
| 1 | 0 | 0 | 0 | Vernier delay | | | | |

Chip ID: The value of DEVSEL for the chip that is to respond.

Port the port ID (0,8,16 or 24)

Vernier Adjust Command

FIG. 29

METHOD AND APPARATUS FOR PROVIDING A PACKET BUFFER RANDOM ACCESS MEMORY

RELATED APPLICATION

This application is a continuation of U.S. application Ser. No. 09/283,778, filed Mar. 31, 1999, now U.S. Pat. No. 6,590,901 which claims the benefit of Provisional Application No. 60/080,362 filed Apr. 1, 1998, the entire teachings of which are incorporated herein by reference.

BACKGROUND OF THE INVENTION

As it is known in the art, computer networks permit the transfer of information from one computer to another. Some networks, referred to as local-area networks (LANs) include a bus that is shared by a number of computers. Local-area networks permit only one computer to send data over the bus at a given time and that computer can only utilize the bus for a certain period of time before it is required to relinquish it. Because of those constraints, each computer typically segments the information into packets having predefined maximum and minimum lengths. Each packet is sent during a separate bus transaction. If more than one computer needs to send information, then the computers alternately send their packets, so as to share the bus.

On some computer networks, for example Ethernet networks, a collision resolution procedure exists that handles the case where two computers attempt to use the bus at nearly the same time. When a collision occurs, the computers involved in the collision must stop transmitting. Then, each computer re-transmits its information at separate times such that a collision is avoided.

Computer networks are more useful where they are connected to one another such that information can be communicated between two computers on different physical networks. This can be done by employing intermediate computers referred to as "routers". Each router has two or more network connections to different physical networks. The routers relay packets received from one interface to the other interface and vice versa. For example, consider the network configuration depicted in FIG. 1. Five hosts 2, 4, 6, 18 and 20, and two routers 8, 10 are connected by networks 12, 14 and 16. The router R1 is able to directly deliver any messages that are intended for delivery to hosts 2, 4, 18 and 20. However, a message that is intended for host H5 must be initially delivered to router R2 which is able to directly deliver it to H5.

Local-area network (LAN) switching is necessary due to the increasing volume of traffic present on many corporate LANs. New applications such as the world-wide web (WWW) and voice-over-IP are responsible for that increased network load. A LAN switch resembles a router in that it relays packets received at one interface, to another interface on the same device. However, the switch must perform this relay operation at high speed and therefore typically does so in hardware rather than software as is the case with a router. Accordingly, it is usually necessary to employ some form of memory in a network switch to handle the case where a packet's intended output port is occupied sending or receiving other traffic. FIG. 2 shows a situation where buffering is required. Ports P1 and P2 each receive traffic for the output port P3. Assuming that the input and output ports operate at the same speed, some form of buffering is required such as queue 22. If port P3 is busy when packets arrive from ports P1 or P2, then the packets are buffered in queue 22. Once port P3 is free, the data packets will be released from queue 22 in the order that they were received.

Two common switch memory architectures exist today that are referred to as the dedicated port memory and the shared global memory. Some switches may use either or both of those architectures to varying degrees. In the dedicated port memory architecture, each network port (either input or output) has memory associated with it. The network port may write packets only into its dedicated memory, and read packets only from its dedicated memory. Usually, a packet must be completely transferred from an input memory to an output memory. However, this transfer methodology is the primary disadvantage of the dedicated port architecture. The other disadvantage is that the amount of memory allocated to a port is finite. If a port's buffer becomes filled, any further information sent to that port will be lost even though memory may be unused elsewhere in the switch. On the other hand, the primary advantage of the dedicated port memory is that there is no need for a port to arbitrate for access to memory, which can be a significant time consuming operation.

In the shared global memory architecture, the switch has access to a single global memory and all network ports must arbitrate for access to that memory. The primary advantages of this architecture are that no copying of packets in memory is required, and the memory is useable by all ports such that no port will be denied any memory until all the memory is in use. The disadvantages of the global memory architecture are twofold. First, a very high bandwidth bus is required to permit all input ports to write into and read out of the memory at speeds that approach the data rate of the network. For example, a twenty-four-port 100 Mbit/second Ethernet switch may perform twenty-four 100 Mbit/second reads and twenty-four 100 MBit/second writes, for a total bus data rate of 4.8 Gbit/sec. It should be noted that such a data rate exceeds the capacity of a 64-bit, 66 MHz PCI bus. The second disadvantage of the global memory architecture is that time is lost in arbitrating for the memory among all of the ports.

SUMMARY OF THE INVENTION

Generally, an embodiment of the present invention is a packet buffer RAM (PBRAM) that provides advantages of the aforementioned memory architectures while removing the disadvantages. PBRAM is a single global memory arranged in a queue architecture, so it has the properties that no packet data copying is required, and that all of the memory is available to all of the ports. PBRAM in the preferred embodiment is a 32-port memory. This means that 32 different devices may access the memory without the need to arbitrate for the data channels.

More specifically, a method and apparatus is provided for storing data packets, transferred across a computer network, in a packet buffer random access memory or PBRAM device. The, PBRAM device receives a number of data packets from network controllers that are coupled to the computer network via associated input ports. After the data packets are received portions thereof are serially transferred to different segments of serial registers that are connected between the input ports and the memory array. Lastly, the data packets are conveyed to the memory array portion of the device in parallel manner while other portions of the packets are being conveyed to other segments of the serial registers.

The PBRAM device further assigns input queue structures in the memory array. It also stores pointers to the packets in a packet table and stores pointers to associated locations of the packet table in the queue structures. Those queue structures are accessible by associated output ports of the PBRAM device such that said pointers are transferred from the input queue structures to associated output queue structures that deliver the data packets to the output ports.

BRIEF DESCRIPTION OF THE DRAWINGS

FIG. 13 depicts the structure of the Read Data Command that can be executed on the PBRAM device of FIG. 7;

FIG. 14 depicts the structure of the Suspend Output Command that can be executed on the PBRAM device of FIG. 7;

FIG. 20 depicts the structure of the Transfer Command that can be executed on the PBRAM device of FIG. 7;

FIG. 21 depicts the structure of the Drop Data Command that can be executed on the PBRAM device of FIG. 7;

FIG. 22 depicts the structure of the Flush Queue Command that can be executed on the PBRAM device of FIG. 7;

FIG. 23 depicts the structure of the Reset Command that can be executed on the PBRAM device of FIG. 7;

FIG. 24 depicts the structure of the No-Op Command that can be executed on the PBRAM device of FIG. 7;

FIG. 25 depicts the structure of the Test Command that can be executed on the PBRAM device of FIG. 7;

FIG. 26 depicts the structure of the Set Chip Count Command that can be executed on the PBRAM device of FIG. 7;

FIG. 27 depicts the structure of the Set Tag Length Command that can be executed on the PBRAM device of FIG. 7;

FIG. 28 depicts the structure of the Timing Reference Command that can be executed on the PBRAM device of FIG. 7;

FIG. 29 depicts the structure of the Vernier Adjust Command that can be executed on the PBRAM device of FIG. 7;

DETAILED DESCRIPTION OF THE INVENTION

Figure 1:
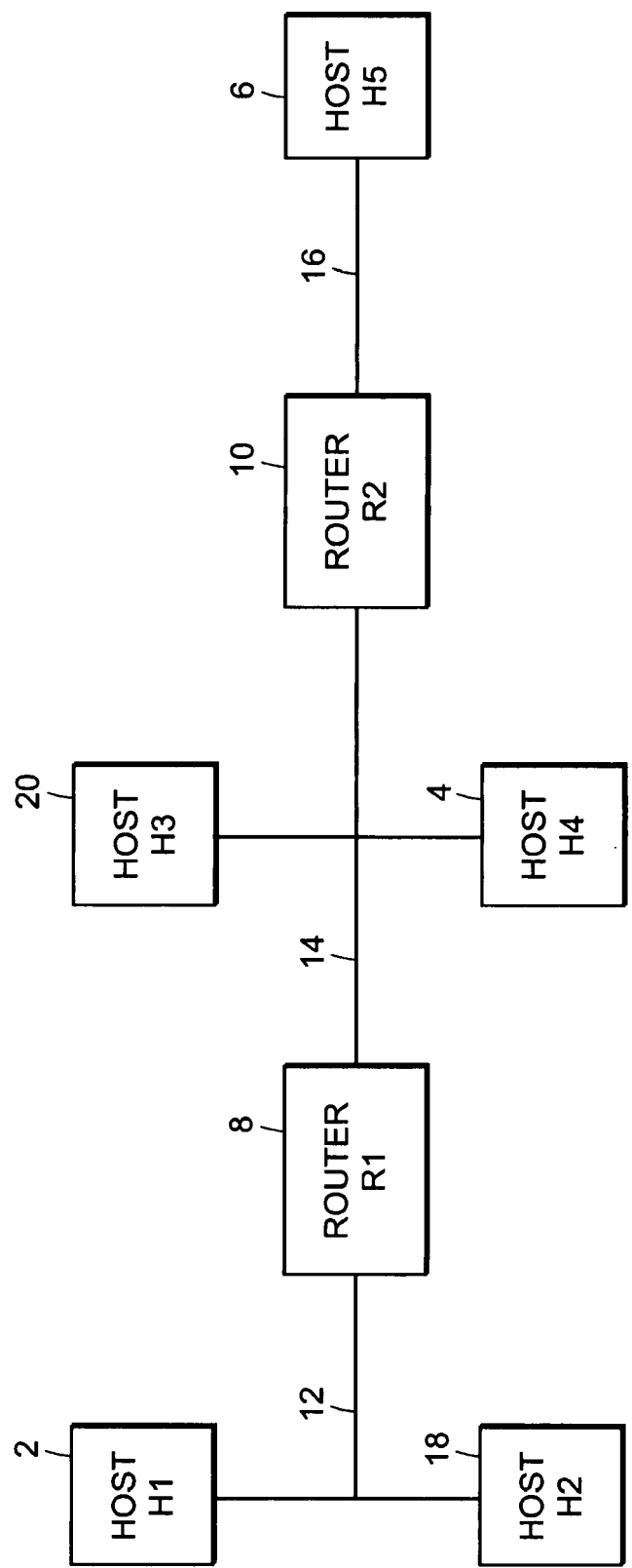
FIG. 1 is a schematic drawing of a typical network configuration.
Figure 2:
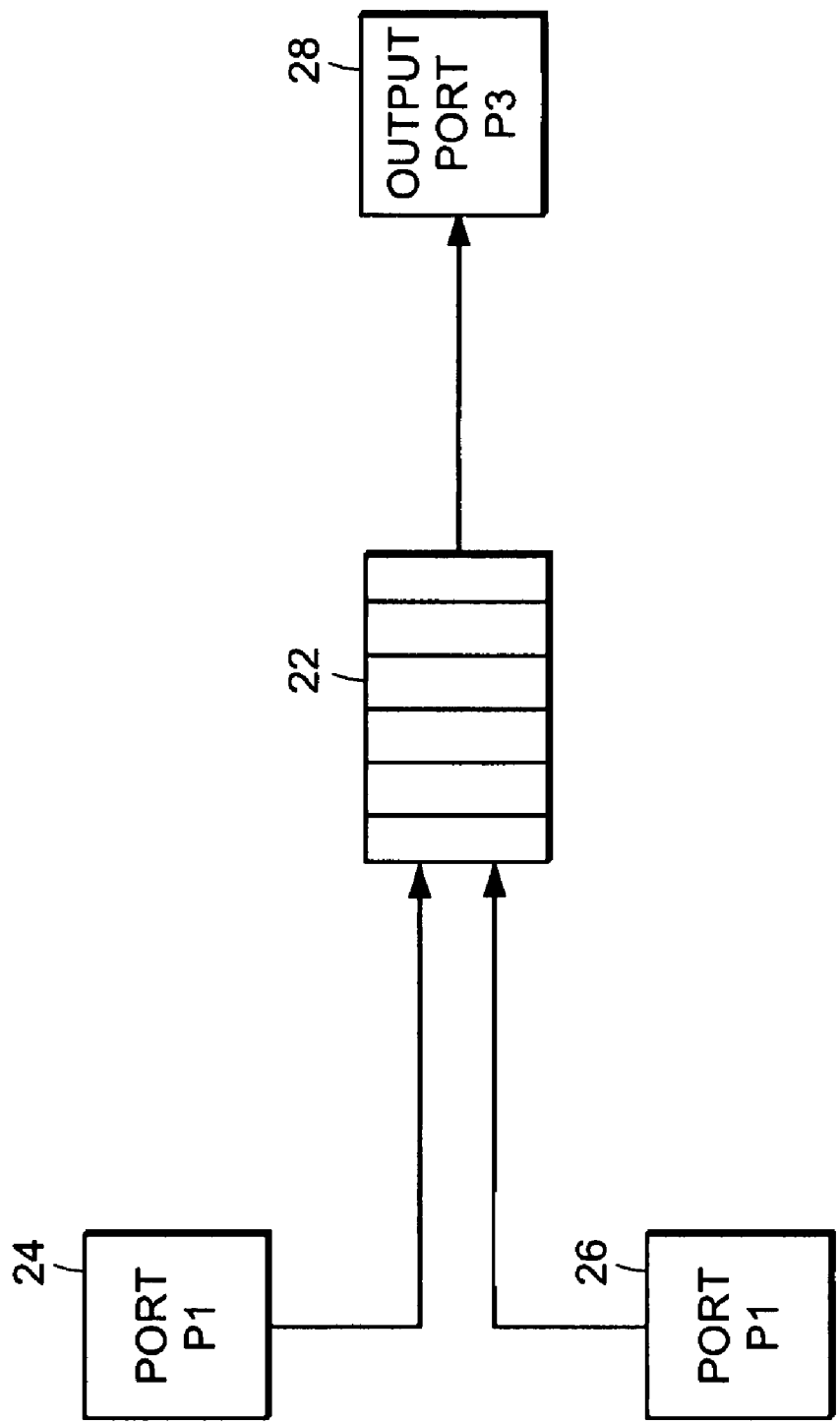
FIG. 2 is a schematic diagram of a buffering operation performed between a number of network ports.
Figure 3:
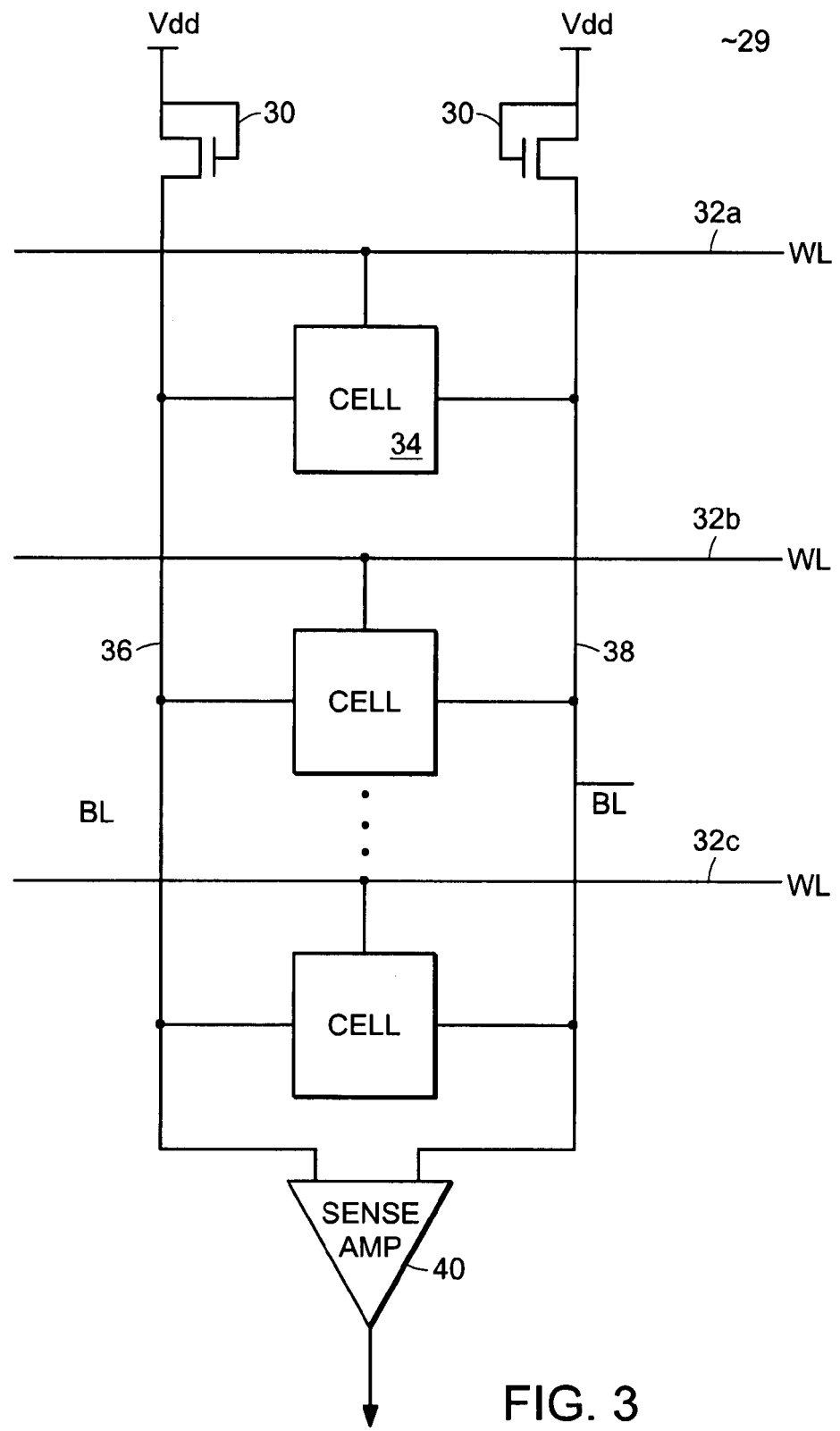
FIG. 3 is a schematic diagram of an SRAM memory configuration.

Generally, an embodiment of the present invention is a packet buffer random access memory (PBRAM) that provides the advantages of the aforementioned memory architectures while removing the disadvantages. PBRAM includes a single global memory, so it has the properties that no packet data copying is required, and that all of the memory is available to all of the ports. The PBRAM of the preferred embodiment includes a 32-port memory. This means that 32 different devices may access the memory without the need to arbitrate for the data channels. Each port may operate at up to 250 Mbit/sec, so the whole chip may run at 8 Gbit/sec. Further, it is much easier to increase the total bandwidth of PBRAM than it is to increase the bandwidth of a PCI bus or similar memory bus.

I. Prior Art Switch Memory Architectures

Two common switch memory architectures exist today that are referred to as dedicated port memory and shared global memory. In the dedicated port memory architecture, each network port (either input or output) has memory associated with it. The network port may read and write packets only into its dedicated memory. Using that architecture, a packet must be completely transferred from an input memory to an output memory. However, this transfer methodology is the primary disadvantage of the dedicated port architecture. The other disadvantage is that the amount of memory allocated to a port is finite. If a port's buffer becomes filled, any further information sent to that port will be lost even though memory may be unused elsewhere in the switch. On the other hand, the primary advantage of the dedicated port memory is that there is no need for a port to arbitrate for access to memory, which can be a significant time consuming operation.

In the shared global memory architecture, the switch has access to a single global memory and all network ports must arbitrate for access to that memory. The primary advantages of this architecture are that no copying of packets in memory is required, and the memory is useable by all ports such that no port will be denied any memory until all the memory is in use. The disadvantages of the global memory architecture are twofold. First, a very high bandwidth bus is required to permit all input ports to write into and read out of the memory at speeds that approach the data rate of the network. Second, time is lost in arbitrating for the memory among all of the ports.

The two primary types of volatile semiconductor memory commonly used to implement dedicated port and shared global memory architectures are static random access memory (SRAM) and dynamic random access memory (DRAM). Each of these memories consists of an array of wordlines and bitlines. In either configuration, a memory is accessed by turning-on one of the associated wordlines. Responsively, all memory cells connected to that wordline either take a new state from the bitlines (write operation), or deliver their state to the bitlines (read operation). For read operations, a circuits called sense amplifiers detect minute voltage changes on the bitlines caused by the memory cells and thereby retrieve the read data from the bitlines. The sensing speed of the device is dependent on the technology used and the load present on the bitlines. Since the bitlines and memory-cell connections are capacitive, increasing the number of memory cells connected to a bitline will slow down the sensing operation.

Each SRAM memory cell is a bistable element that will retain its state as long as power is supplied to the device. FIG.

3 is a block diagram depicting a portion of a typical fast SRAM memory 29. SRAM memory cell 34 is connected to wordline 32a and bitlines 36 and 38. Clamp devices 30 prevent the bitline voltage from falling below a level defined by the supply voltage (Vdd) minus the threshold voltage (Vtn) of transistors 30a and 30b. When wordline 32a is turned-on during a read cycle, the memory cell 34 outputs complementary versions of its state on bitlines 36 and 38. Note that a differential signal is used on bitlines 36 and 38 such that the state is accurately sensed with sense amp 40. When the read cycle is complete, wordline 32a is turned off. A different wordline may then be turned-on for the next read cycle depending on the data to be retrieved. The memory is designed such that each SRAM memory cell may rapidly pull the bitlines 36 and 38 to a proper state during a read cycle. Each bitline 36 and 38 is guaranteed to be no more than a threshold voltage Vtn away from its final value at the start of the read. Typically, the entire operation occurs within 20 ns or less, from the time that the read command is specified to the device to the time when output data is available on the data pins.

Figure 4:
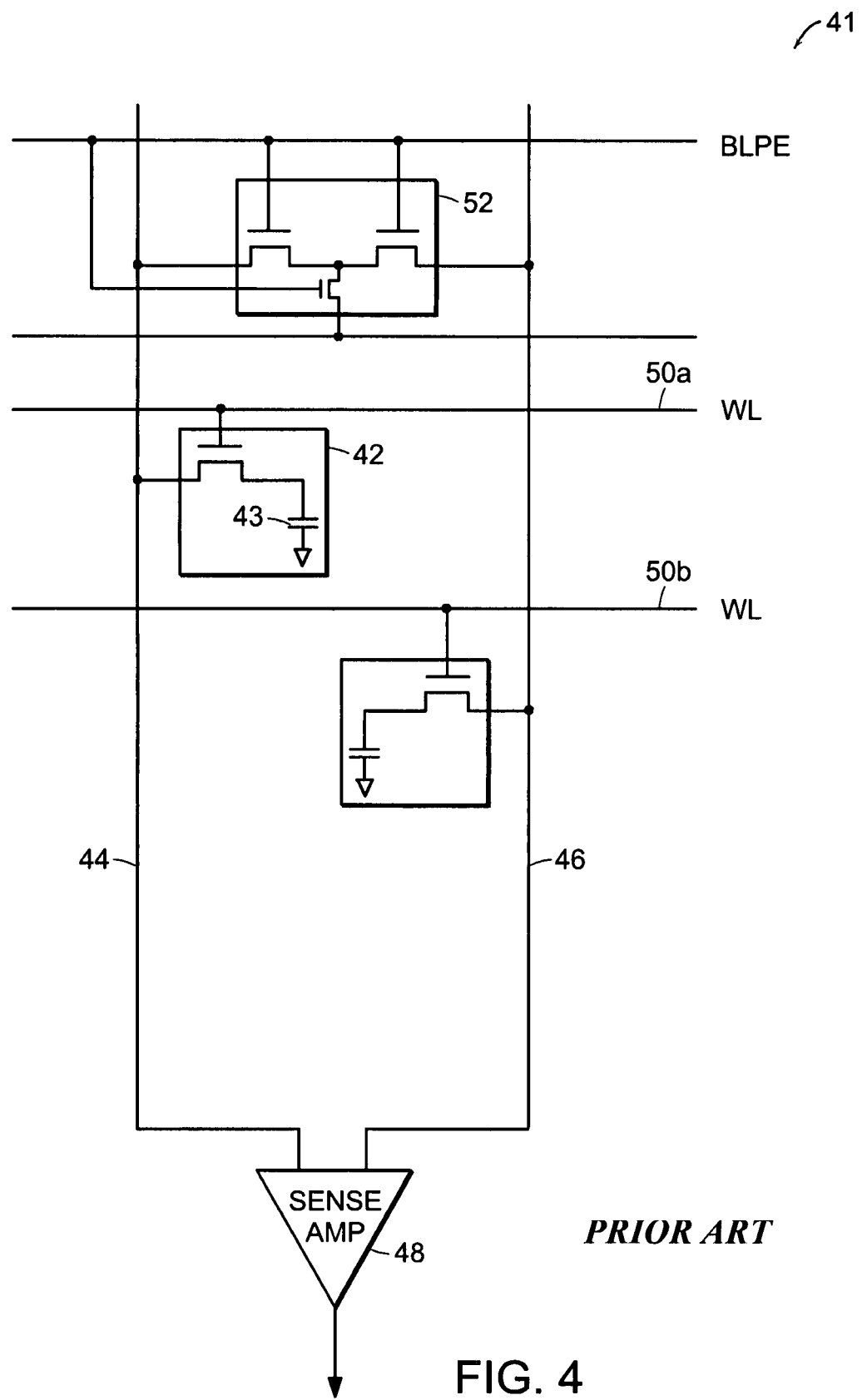
FIG. 4 is a schematic diagram of a DRAM memory configuration.

In contrast, FIG. 4 depicts a block diagram of a DRAM memory 41. A single-transistor DRAM cell 42 stores a logic state as a small amount of charge on a capacitor 43. Accordingly, a read operation of a DRAM memory cell 42 proceeds much differently than a read operation of an SRAM memory cell. Since DRAM memory cell 42 is incapable of reversing the differential voltage on bitlines 44 and 46, they are precharged to a common voltage level by precharge circuit 52 before the read operation is commenced. To start the read cycle, wordline 50 is turned on, at which point the charge stored in memory cell 42 is dumped onto bitline 44. Note that only one bitline is connected to each memory cell of the DRAM memory whereas both bitlines were connected to the SRAM memory cells. The small charge difference can then be sensed with the sense amp 48. After the read cycle completes, wordline 50a is turned off and a precharge cycle is performed. A precharge cycle is always performed at the end of the read cycle so that the memory cells can respond to a new access with minimum latency. The read sensing operation in a typical DRAM takes 30-60 ns, with the precharge taking an additional 30 ns. Accordingly, the overall operation is much slower than that of the SRAM.

To make DRAM memory 41 more attractive to users despite its slower operation, DRAM accesses are divided up into "row cycles" and "column cycles". During each row cycle, a wordline, e.g. 50a, is raised, and sensing occurs. At this point, column cycles may occur. Since the DRAM memory data appears at the output of the sense amplifiers, multiple column-cycle reads can actually occur as fast as they do in an SRAM memory 29. However, to change to a different row, a precharge cycle for the current row and a row cycle for the new row must be performed. Effective use of row and column cycles requires that adjacent memory accesses reference the same row as much as possible.

Figure 5:
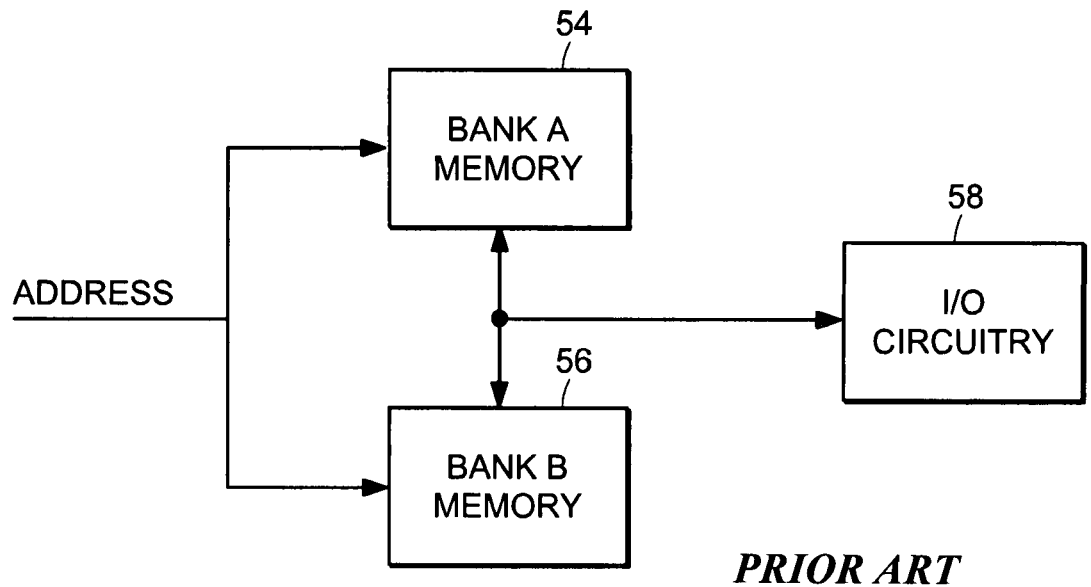
FIG. 5 is block diagram of a two-bank DRAM device.

To further improve the performance of DRAM memory, multiple banks of DRAM memory cells are used. Each DRAM bank is an independent memory device however all banks share the same input and output ports. Consider the two-bank device shown in FIG. 5. Bank A 54 and Bank B 56 each connect to I/O circuitry 58. Such an architecture permits row cycles to be started in banks A 54 and B 56 concurrently. Data may be read first from bank A 54, then from bank B 56. While data is being read from bank B, bank A is precharged and a new row cycle is started. Column cycles can then proceed from bank A 54 while bank B 56 is being precharged. In this manner, DRAM reads can proceed continuously, without an externally visible pause for a new row cycle. There is no limit to the number of banks that can be used, although the additional circuitry required for each bank uses additional silicon area. Since network traffic patterns are effectively random, it is difficult to use DRAM memory in a manner that optimizes the memory accesses for effective use of row and column cycles.

II. Packet Buffer Random Access Memory

Figure 6:
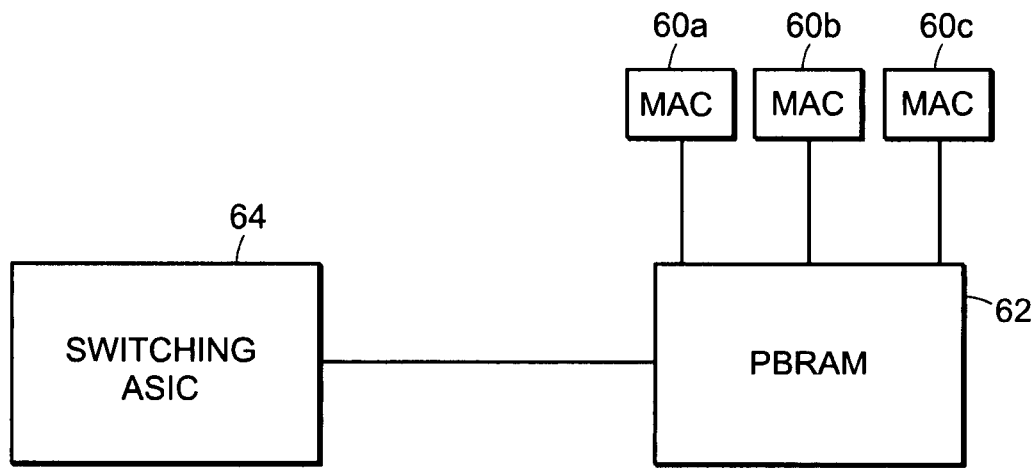
FIG. 6 is a block diagram of a network switch configuration that includes a PBRAM device, according to the present invention.

Referring now to FIG. 6, an exemplary network switch is shown to include a Packet Buffer Random Access memory or PBRAM 62. PBRAM 62 is a 32-port scalable memory device used in a packet switching environment. As shown, devices that interface to a network, referred to as media-access controllers or MACs 60, all connect to PBRAM 62. In addition, a switching ASIC 64 also connects to the PBRAM 62. The switching ASIC 64 contains a hardware implementation of the network packet switching/routing algorithms. Note that all MAC devices 60 have direct access to the PBRAM through their own dedicated ports.

Figure 7:
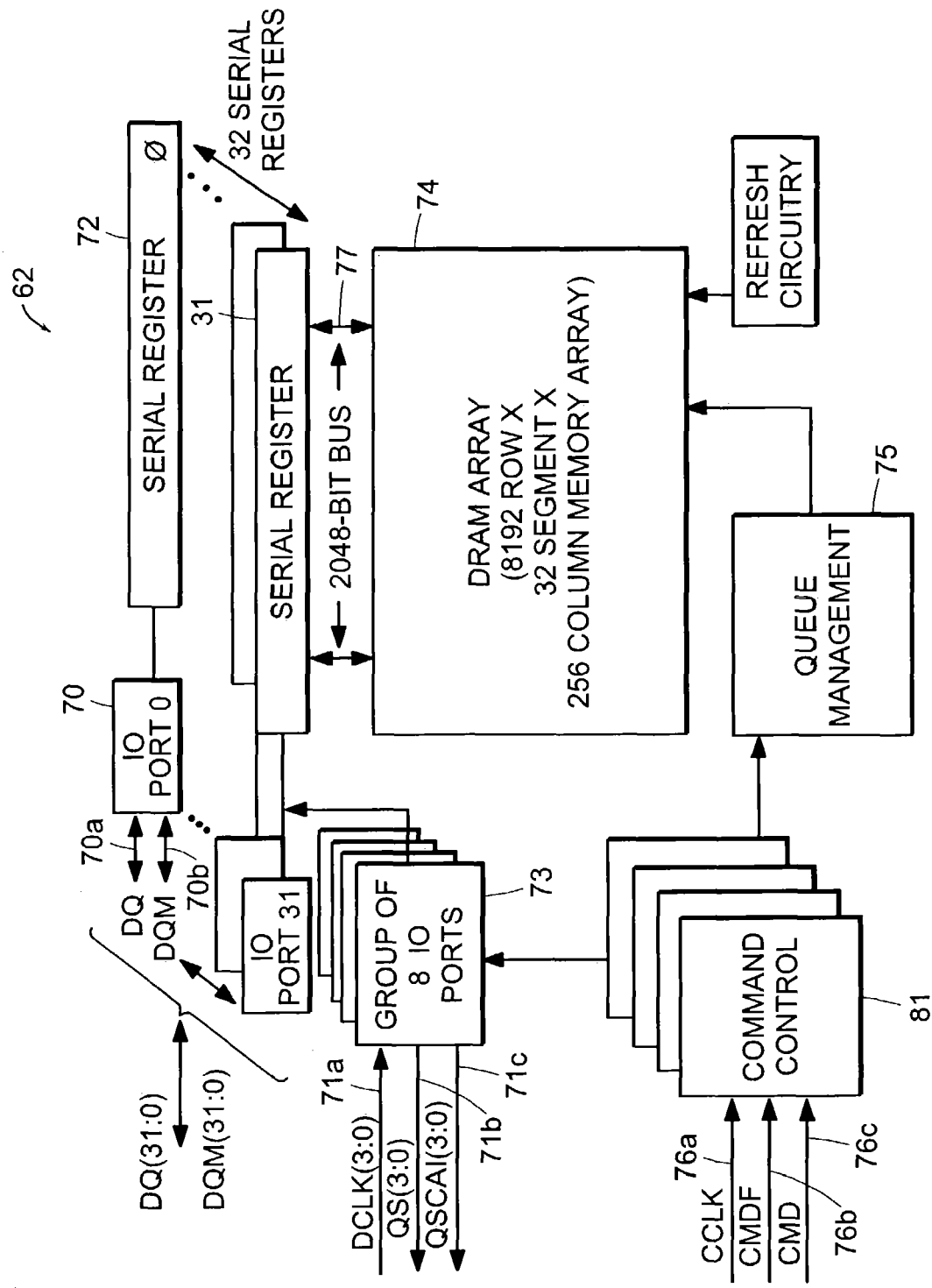
FIG. 7 is a schematic diagram of the PBRAM device of FIG. 6.

A block diagram of PBRAM 62 is shown in FIG. 7. Thirty-two I/O ports 70 each connect to an associated one of thirty-two serial registers 72. A 2048-bit wide databus 77 connects the serial registers to DRAM array 74. While in the preferred embodiment the I/O ports 70 are half-duplex ports, full-duplex ports such as required for some network protocols can be implemented through the use of one port for each data transfer direction. Each data port consists of two bi-directional pins DQ 70a and DQM 70b. The thirty-two ports 70 are grouped into four groups of eight ports each. Each group runs off a common clock referred to as signal DCLK 71a. There are four DCLK pins 71a on the PBRAM device 62, one for each group of ports. In addition, each group of ports has two return clock outputs referred to as signals QS 71b and QSCAL 71c. Their functions will be described below.

In addition to the thirty-two data ports, four control ports 76 are provided to submit commands to the PBRAM 62. Each control port consists of a command clock CCLK 76a, a command flag CMDF 76b and an eight-bit command port CCMD<7:0> 76c. The devices connected to PBRAM 62 multiplex commands onto the command ports 76. For example, it is common to have a single semiconductor chip with eight Ethernet MAC devices 60 on it. Such a semiconductor chip would connect to eight PBRAM I/O ports 70, and one control port 76. All I/O operations initiated from that MAC chip 70 would issue over the single control port 76.

It will be recognized by one of ordinary skill in the art that an alternate embodiment of the present invention could include full-duplex I/O ports so that protocols such as the gigabit Ethernet protocol may be supported without requiring a port for each direction. In addition, a full-duplex PBRAM solution could be implemented by merging the command and data ports such that commands and data are intermixed on the input ports, thereby eliminating the need for arbitration of commands on the control ports 76.

Two data signaling techniques, referred to as single-data rate (SDR) signaling and double-data-rate (DDR) signaling, are supported by PBRAM 62. When SDR signaling is utilized, a new data item is available on each rising edge of signal DCLK 71a. When DDR signaling is used, a new data item is available at both the rising and falling edges of signal DCLK 71a. Accordingly, DDR signaling doubles the maximum rate at which data may be transferred at the expense of complicated timing circuitry such as a delay-locked loop (DLL). However, as will be shown later, PBRAM 62 requires a DLL for other reasons, so this does not pose an implementation problem.

With typical embedded DRAM process technologies, a maximum clock speed of 125 MHz can be achieved. Such clock speeds permit I/O port 70 to operate at 125 megabytes per second (Mbps) in SDR mode and 250 Mbps in DDR mode. These port speeds are sufficient for many network protocols, e.g. 10/100 Mbps Ethernet, and 155 Mbps FDDI. However, such speeds are not sufficient for the gigabit Ethernet protocol. To accommodate the gigabit Ethernet protocol, PBRAM permits two, four or eight I/O ports 70 to be aggregated, i.e. the ports operate in parallel. For example, a gigabit Ethernet port can be formed by aggregating four I/O ports 70 that are operating in DDR mode.

As previously mentioned, each I/O port 70 includes two signals referred to as DQ 70*a* and DQM 70*b*. Signal DQ 70*a* is a data signal that conveys packet data as a serial stream of logical zeroes and logical ones. Signal DQM 70*b* is a mask signal that is used to qualify that packet data as follows:

| DQ | DQM | Qualified Meaning |
|----|-----|-------------------|
| 0  | 0   | Logic low         |
| 1  | 0   | Logic high        |
| 0  | 1   | No data           |
| 1  | 1   | End-of-packet     |

The "no data" qualification is used when the MAC devices 60 do not run at the same clock speed as I/O port 70 and hence there are some clock cycles that convey no information and should be ignored. That qualification is also necessary where the network protocol performs a "bit-stuffing" operation. For example, in the HDLC protocol used for X.25 and Frame Relay communication, a sequence of six consecutive logical one values in the user data is prohibited from occurring. When such a bit pattern occurs in data to be transferred, the HDLC transmitter inserts a logical zero bit after the fifth logical one bit to break up the prohibited sequence. The HDLC receiver will remove such bits so that the data returned to the user is the same as the data that was sent. However, if the data stream entering PBRAM 62 is synchronous with the data stream entering the HDLC receiver, then a "hole" in the data will occur when the padded "0" bit is removed. To keep the two devices in synchronization, a "no data" indication is sent to PBRAM 62 at that time. Finally, the two-bit interface permits a fourth qualification referred to as "end-of-packet". That qualification is used when working with protocols where the length of a packet is not known in advance. Accordingly, once a MAC device 60 detects the end of a packet, it can signal this condition to the PBRAM 62 by generating an end-of-packet signal.

III. DRAM Array Architecture

Figure 8:
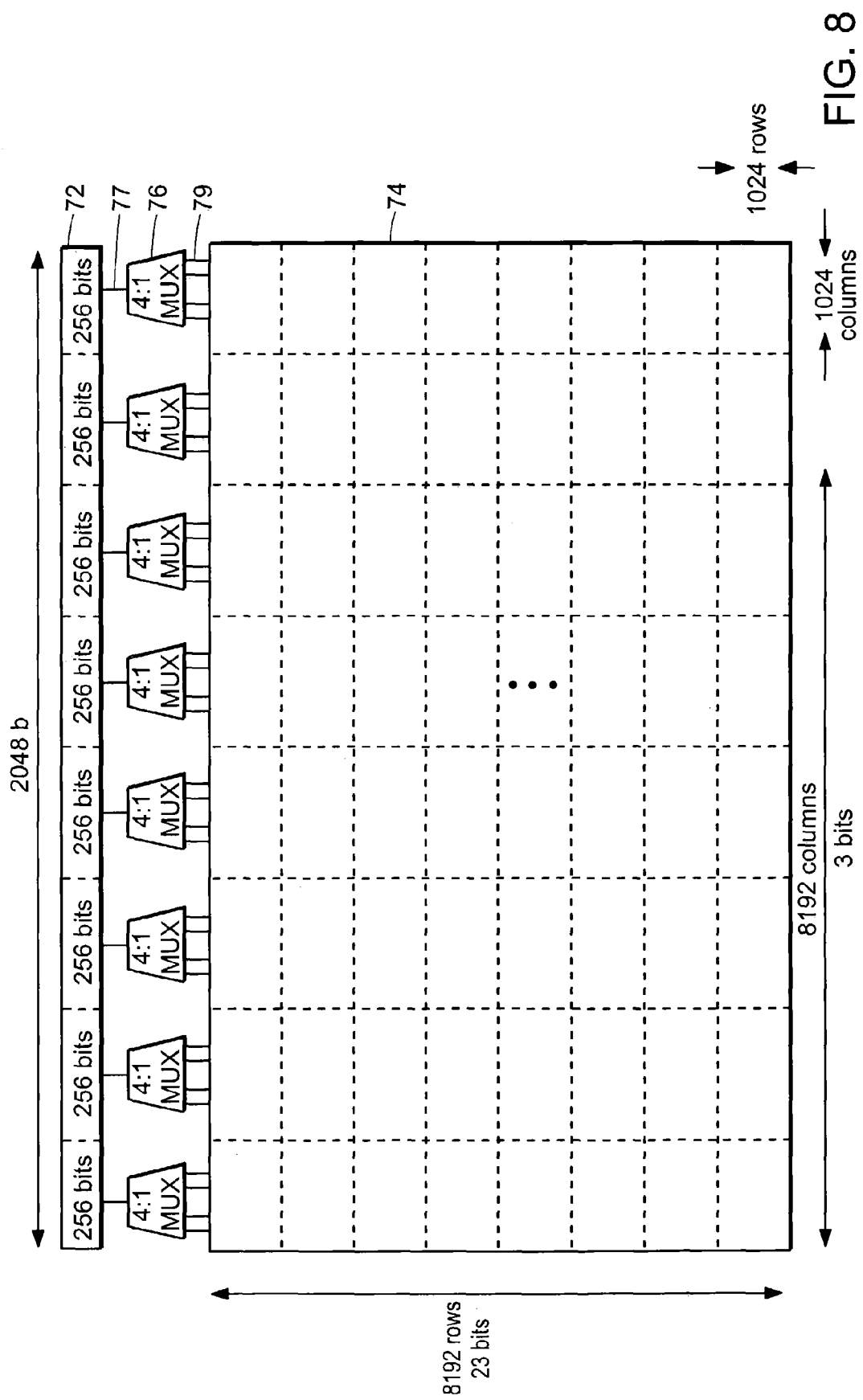
FIG. 8 is a schematic diagram of an internal DRAM memory array of the PBRAM device of FIG. 6.

Referring now to FIG. 8, the internal DRAM array 74 architecture of PBRAM 62 is shown. The DRAM array 74, also referred to as the core 74, consists of 8192 rows and 8192 columns for a total of 64 Megabytes of memory capacity. The core 74 is broken up into 64 banks, each including 1024 rows and 1024 columns. Each bank has its own row and column circuitry such that the banks may operate independently. Each serial register 72 is 2048 bits wide. The serial registers 72 are divided into eight segments of 256 bits each. There are a total of thirty-two serial registers 72 or one for each of the PBRAM's 62 I/O ports 70. Each serial register 72 is connected to the DRAM array 74 and the adjacent registers by a 2048-bit wide data bus 77. Each data bus 77 is connected through a 4:1 multiplexer 76 to an 8192-bit wide DRAM databus 79. The 4:1 multiplexer 76 is utilized because the SRAM cells that make up the serial registers 72 are four times as wide as the DRAM cells in DRAM array 74.

On packet data input, once a segment of the serial register 72 is full, its contents may be transferred to the DRAM array 74 using a single column cycle. Typically, PBRAM 62 will input data until a segment of the serial register 72 is half-full, at which point the data will be copied into the DRAM 74, concurrent with more data being input into another segment of the serial register 72. In this manner, data transfer into the serial register can be seamless. The multi-bank architecture permits row cycles for up to eight packets, corresponding to the eight segments, to be run simultaneously. Since access to DRAM array 74 is not necessary until the contents of the serial registers 72 are ready for transfer, there is ample time to perform any required row cycles. On packet output, the reverse operations occur. In other words, a portion of a packet is transferred into one or more segments of serial register 72, from which the data may be read out from the data port. In the meantime, row cycles for additional packet data may be performed.

To keep the system flexible, PBRAM 62 is addressed as if it were an array of queues. Each memory address supplied to PBRAM 62 represents a queue. A write operation appends a packet of data to the tail of such a queue, and a read operation obtains a packet of data from the head of such a queue. Further, a data transfer command causes packets to be copied from one queue to another. The transfer command is processed by modifying pointers to packet data within the PBRAM 62 itself Therefore, no packet data is actually moved around in memory. Addressing by queues transfers all responsibility for optimal address allocation from the end user, i.e. MAC devices 60, to the PBRAM 62 itself. Each PBRAM 62 may therefore perform allocation that is optimal for its configuration. Consequently, some of the memory capacity of the PBRAM 62 is consumed by queue management operations.

An embodiment of PBRAM 62 supports a total of 256 queues. Each queue is further broken down into sub-queues that are each associated with one of sixteen priority levels, for a total of 4096 queue/priority-level combinations. The sub-queues and priority levels permit quality-of-service (QoS). For example, if a queue is mapped to an output port, then the sub-queues may be used to hold regular and priority packets at different priority levels. Therefore, when data is read from the queues, it is retrieved from the highest priority sub-queue that contains data.

When a packet is written to PBRAM 62, it is stored in a physical location in memory array 74 that is currently unused. An associated write command will identify a queue structure within that memory to which the packet should be associated. Accordingly, a pointer to the physical location in memory array 74 is maintained in a packet table. When the packet is associated with a queue structure, a pointer to the appropriate packet table entry is placed on that queue structure. Therefore, upon issuance of a read command, the pointer on the queue is transferred to an output queue such that the packet can be accessed and output via the serial register 72. More specifically, a PBRAM system has 4096 packet queues. All data in a PBRAM system is addressed through 12-bit queue descriptors. A packet switch does not need to perform its own queue management.

A packet switch can use the queues in any number of ways. For example, each of the 32 ports can have its own input and output queue. For prioritized service, each port can be assigned multiple queues. For example, 16 input and 16 output queues may be set up per port, using only 1024 of the 4096 available queues. PBRAM puts no restrictions on queue assignment; the controller may use the queues as it sees fit.

When data is written to PBRAM, the write command must specify a queue to write to. The packet will be appended to the tail of the requested queue. PBRAM will automatically direct packet data to an unused area on the chip.

A read command must specify a queue to read from. PBRAM will return the packet at the head of the queue. The read command may optionally dequeue the packet. If a packet is not dequeued, then a subsequent read command for the same queue will return the same packet. If a packet is dequeued, then the memory occupied by the packet will be returned to a free pool for re-use.

PBRAM supports a cut-through operation. If a write command is issued to an empty queue, then a read command may be issued from the same queue no earlier than 256 bit-times after the start of write data. In this case, PBRAM will return the data being written. Care must be taken not to underrun in a cut-through operation: if the write function is held up such that fewer than 256 bits separate the current read and write pointers, then the returned data is undefined.

A data transfer command allows a packet at the head of one queue to be dequeued and appended to the tail of another. This operation is the only way to move packets in a PBRAM system. It is also the only way to address specific packets. If multiple read operations must be performed on a single packet, then the read commands must not dequeue the packet. If the PBRAM controller does not want repeated processing of one packet to block processing of others, then it may move the packet to an empty queue where it can be processed without blocking traffic at the source queue.

A queue drop command causes the packet at the head of the specified queue to be dropped. This operation is useful in case PBRAM experiences congestion.

Finally, a queue flush command causes the entire contents of a queue to be freed. Only one queue flush operation may be in effect in the entire PBRAM system at any given time.

All queues are emptied upon chip reset.

When a packet is written to PBRAM 62, the PBRAM 62 will allocate memory for it. When the packet is read back to the network, i.e. when it is de-queued, PBRAM 62 will return the contents of the memory occupied by the packet to a list of free memory locations, referred to as the free pool. It is possible for a packet to be present in more than one queue at the same time. For example, to broadcast a packet, therefore, the memory the packet occupies is re-used only after the last instance of the packet is de-queued.

In addition to the packet data itself, MAC controllers 60 often need to know the length of a packet before it is transmitted. For this reason, PBRAM 62 permits a MAC controller 60 to inquire about the length of a packet without reading the entire packet itself. This is done by storing the length of a packet along with its data in the memory array. Alternatively, PBRAM 62 may be configured to pre-pend the packet length to any read data it returns.

Some network switches operate by examining incoming packets and assigning each packet a "tag" indicating how the packet is to be processed. PBRAM 62 allows such a packet tag (up to four bytes long) to be assigned to each packet and stored at a predetermined memory location that is associated with that packet. Again, the packet tag can be read back without reading back any of the packet data itself. Alternatively, PBRAM 62 can be configured to pre-pend the packet tag to any read data it returns.

IV. Method of Operation

Figure 9:
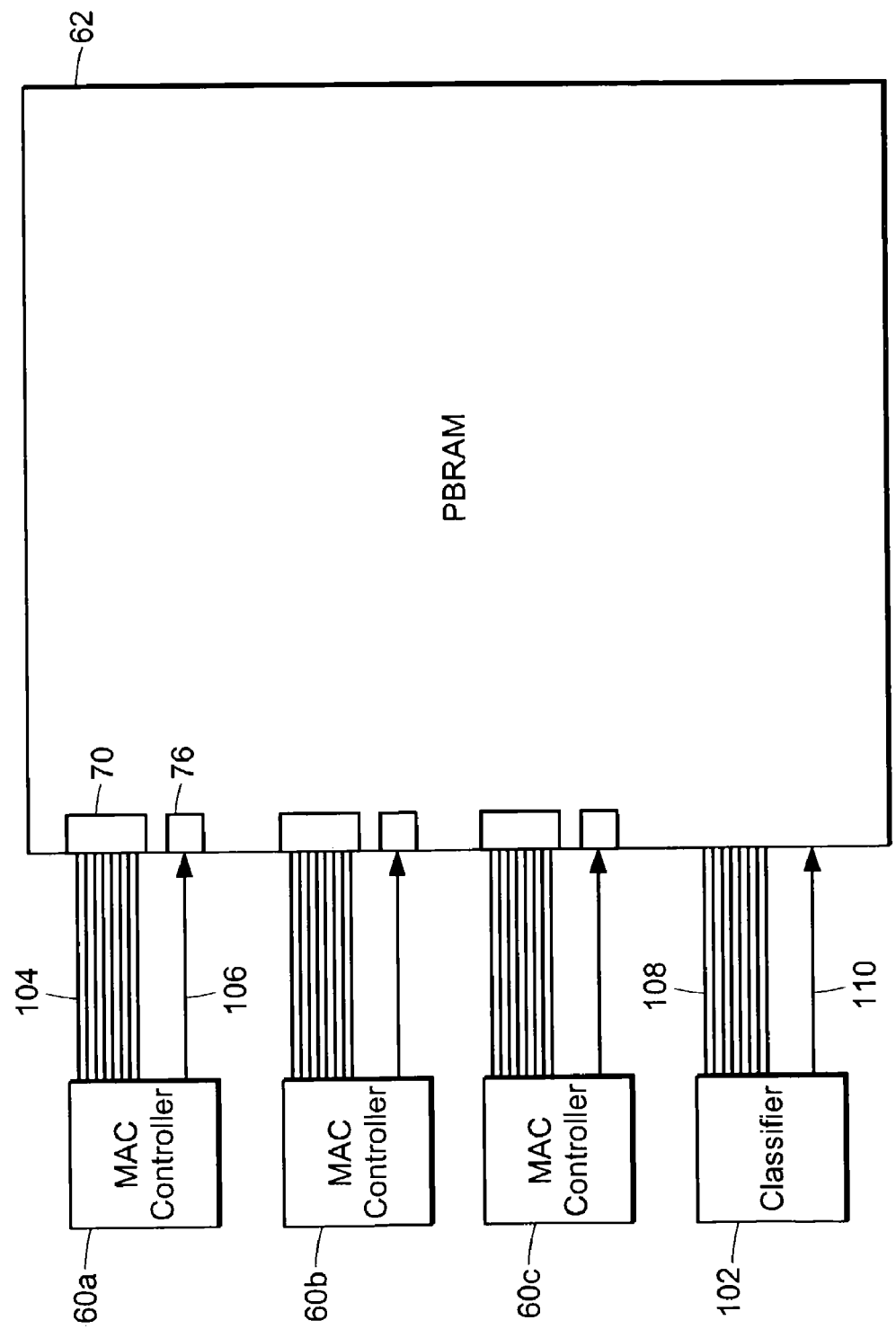
FIG. 9 is a block diagram of a twenty-four port Ethernet switch including the PBRAM device of FIG. 6.
Figure 12:
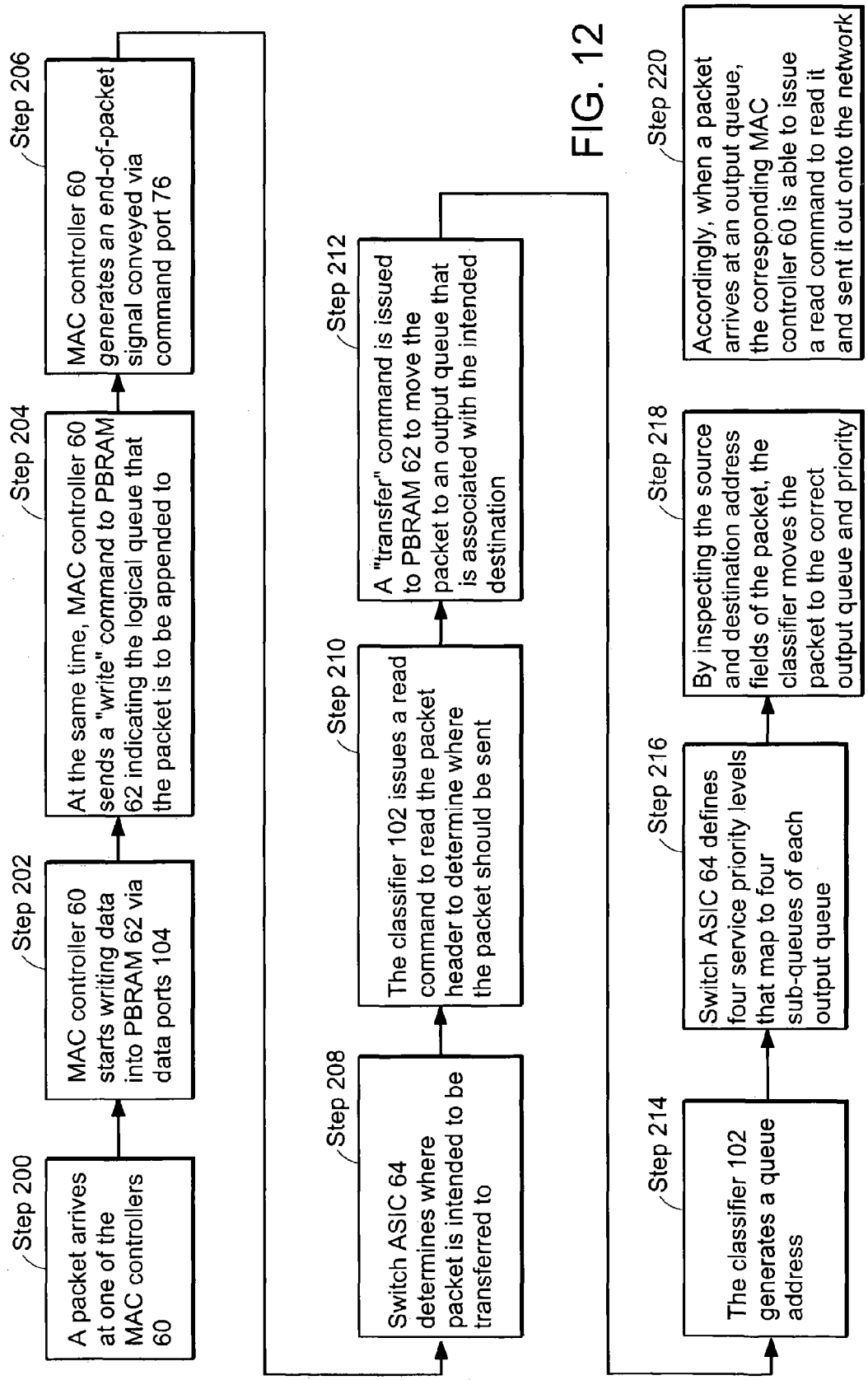
FIG. 12 is a flow diagram of the operation of the PBRAM device shown in FIG. 6.

To illustrate how PBRAM 62 improves packet switching, consider the 24-port Ethernet switch shown in FIG. 9 and the flow diagram of FIG. 12. Three eight-port Ethernet MAC controllers 60 are connected to PBRAM 62. Each MAC controller 60 has eight data ports 104 that connect to the eight I/O ports 70 of the PBRAM 62. Also, each MAC controller 60 connects to a command channel 106 that is coupled to the command port 76 of PBRAM 62.

When a packet arrives at one of the MAC controllers 60 (step 200), that MAC controller 60 will start writing data into the PBRAM 62 via data ports 104 (step 202). At the same time, the MAC controller 60 sends a "write" command to the PBRAM 62 via the command channel 106 and command port 76, indicating the logical queue that the packet is to be appended to (Step 204). Each I/O port 70 has its own logical input queue wherein queue addresses 0-23 are used for each of twenty-four input queues reserving 8 ports for classifier. A separate input queue is required for each Ethernet connection so that the origin of the packets can be identified. This information is often used to make filtering decisions for security reasons. It should be noted that the PBRAM device 62 actually includes thirty-two input queues that can be associated with I/O ports 70. However, eight of those ports are typically dedicated for use by the classifier 102, as will be described.

The length of an Ethernet packet is not known in advance, rather, the end of the packet is detected when the physical Ethernet transceiver detects an absence of the incoming signal. For this reason, the MAC controller 60 must generate an end-of-packet signal conveyed via command port 76 to denote the end of the packet (i.e. signals DQ 70*a* and DQM 70*b* are asserted to logical "one" values as previously described) (Step 206).

In considering a data packet's trip through the system of FIG. 6, after receiving the packet, the switch ASIC 64 determines where it is intended to be transferred to (Step 208). This is done using the classifier 102. The classifier 102 connects to the PBRAM 62 using a data channel 108 and the fourth command channel 110. The classifier 102 issues a read command to read the first few bytes of the packet, i.e. the packet header, in order to determine where the packet should be sent (Step 210). Once the classifier 102 has seen enough of the packet to determine where it should go, a "transfer" command is issued to PBRAM 62 to move the packet to an output queue that is associated with the intended destination (step 212). Logical queue addresses 24-47 map to output queues for each I/O port 70 and therefore the classifier 102 generates one of these queue addresses (step 214). Furthermore, the switch ASIC 64 defines four service priority levels that map to four sub-queues of each output queue (step 216). By inspecting the source and destination address fields of the packet, the classifier is able to move the packet to the correct output queue and priority (step 218). Accordingly, when a packet arrives at an output queue, the corresponding MAC controller 60 is able to issue a read command to read it and sent it out onto the network (step 220).

V. Expansion of Memory

As previously described, the PBRAM 62 includes 64 megabits of memory storage capacity. That memory capacity represents the current state of the art on merged DRAM logic processing. However, the resulting memory size of 8 MB is too small for many purposes. For this reason, PBRAM 62 has been designed such that it is extensible. In other words, multiple PBRAM devices can be connected together to form a larger PBRAM.

Figure 10:
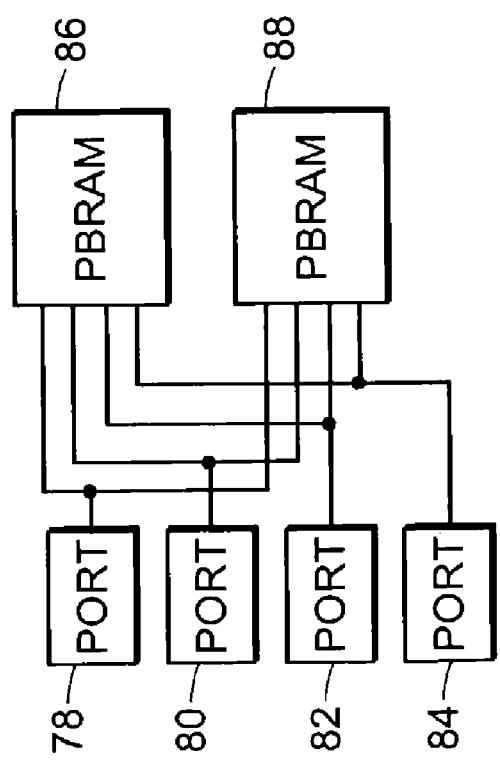
FIG. 10 is a block diagram of a configuration including a number of PBRAM devices such as shown of FIG. 6.

To remain effective, multiple PBRAMs 62 should be combined in parallel such that each network port is connected to each PBRAM 62. For illustration purposes, such a merged and interconnected architecture is shown in FIG. 10. Here, each of the ports 78, 80, 82 and 84 is connected to both PBRAMs 86 and 88. With such a configuration a packet may easily be switched from port 78 to port 84 and therefore the I/O ports can be utilized in conjunction such that the combination of PBRAM 86 and PBRAM 88 appear to be a single, larger version of the same device. Packets are distributed between PBRAMs 86 and 88 by writing those packets into one PBRAM 86 or 88 until it is full. Once it is full, the other PBRAM 86 or 88 begins to store the packet beginning with the data element that was not stored in the other PBRAM.

It is possible for a single packet to be distributed across both PBRAMs 86 and 88. The PBRAMs 86 and 88 must communicate with one another to determine which one of them is nearly full (and therefore to start filling the other), and to co-ordinate the subsequent read-out of the distributed packet data.

Figure 11:
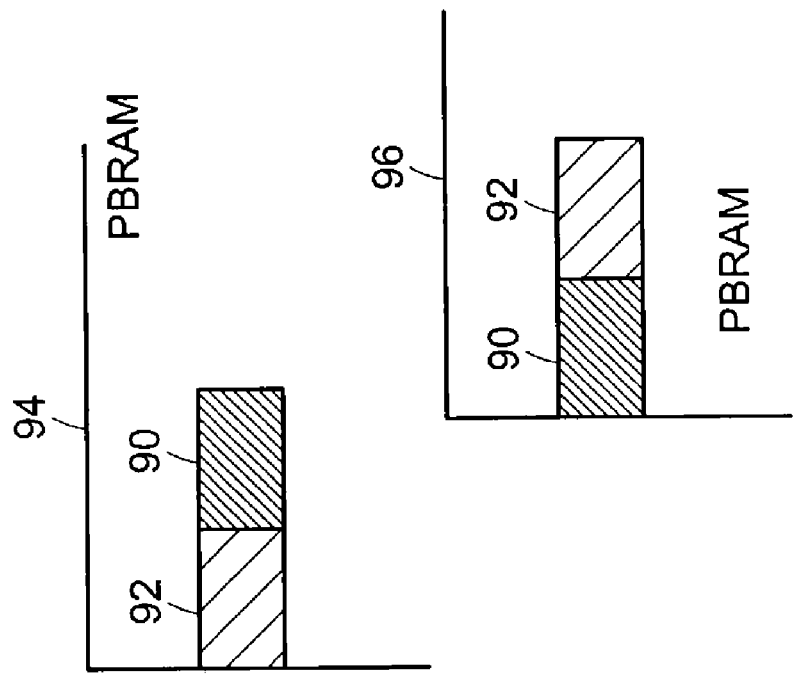
FIG. 11 illustrates packets that have been distributed across the configuration of PBRAMs, such as shown in FIG. 10.

An alternate technique, used in an embodiment of the invention, is to distribute all packets evenly across all PBRAMs 86 and 88 in the system, as diagrammatically shown in FIG. 11. Two PBRAMs 94 and 96 are shown with two packets 90 and 92. The packets are stored in the same bank, row and segment of each PBRAM 94 and 96. The first half of packet 90 is stored in PBRAM 96, and the second half of packet 90 is stored in PBRAM 94. Similarly, the first half of packet 92 is stored in PBRAM 94 and the second half of packet 92 is stored in PBRAM 96. Using that storage scheme, a portion of every packet is stored in each PBRAM. Each PBRAM 94 and 96 is connected to the command 76c and data ports 104 in parallel. Accordingly, since all PBRAMs 94 and 96 in that configuration are subject to the exact same network traffic, and all PBRAMs 94 and 96 implement the exact same queuing and allocation algorithm, the PBRAMs 94 and 96 can operate in lock-step without any need for communication between them. With such a scheme, each PBRAM 94 and 96 is configured with a chip address using external pins. Once configured, each PBRAM 94 and 96 knows which portion of each packet it is responsible for.

VI. Timing Calibration

To an external device, read data returned from the PBRAMs 62 has to appear seamless, even though the actual PBRAM 62 that is sourcing the data may change throughout the packet transfer. Such a requirement is complicated by the fact that on a circuit board, the trace length between a PBRAM and the device it is sending data to may vary. The variance in trace length causes a variance in data timing. In extreme situations, those variances may lead to synchronization failures at the receiver device and will typically cause momentary bus contention when one PBRAM 62 starts to drive the bus just before the previous PBRAM 62 stops. However, the PBRAM 62 includes complex timing scheme that prevents such problems from occurring.

For writes from network controllers into PBRAM 62, each group of eight PBRAM ports is associated with a DCLK signal 71a. The network controller sending data to PBRAM 62 drives DCLK 71a and ensures that the data being written is synchronous thereto. Accordingly, each PBRAM 62 is synchronized to DCLK 71a and latches the data at the rate indicated thereby. This mode of operation is robust since there is only one transmitter, i.e. the network controller.

On the other hand, Read operations cause data to be generated by PBRAM 62 and transmitted to the network controllers. These operations are much more complex since they involve a multiple number of transmitters, as will be described. Each PBRAM 62 has two output pins QS 71b and QSCAL 71c associated with each group of eight I/O ports. The QS signal 71b generates a clock signal to which the data output signal must be referenced. Each PBRAM 62 is equipped with a programmable delay-lock loop (DLL) that is used to insert a programmable phase difference between the DCLK 71a and the QS 71b signals. When the system is first powered up, each network controller calibrates the clocks of the PBRAM ports connected to it. Calibration is performed by instructing one PBRAM to output its timing reference on its QS signal 71b, and instructing another PBRAM to output its timing reference on the QSCAL signal 71c. Any other PBRAMs in the system are kept silent. The network controller may then evaluate the phase difference between QS 71b and QSCAL 71c. If a phase difference is detected, then the DLL on one of the PBRAMs is tuned to eliminate the phase difference. The network controller must tune each PBRAM 62, to which it is connected, in turn.

VII. Summary of PBRAM Commands

Commands are sent to the PBRAM 62 over one of the four command ports 76. Although each command port is typically associated with a group of eight ports, there is no requirement that this be the case. All command data bytes are sampled at the rising edge of the command clock CCLK 76a, regardless of whether the operating modes SDR or DDR are selected for any given port. The CMDF signal 76b is used as a flag indication in that it is de-asserted to a logic low level at the start of a command, and is asserted to a logic high level on occurrence of the last byte of a command. The PBRAM command controller may issue commands back-to-back. The commands themselves consist of a variable-length stream of bytes wherein the shortest command is two bytes long.

Commands are delivered to PBRAM through the command bus. There are four independent command buses. The multiple buses permit a PBRAM system to be controlled from multiple switch controllers without having the controllers perform any arbitration procedure for the command bus. Commands are variable length; the shortest command is two bytes long. The CMDF signal is used to frame commands. It is high when the command bus is idle, and on the last byte of a command. CMDF is low otherwise. The PBRAM provides no acknowledgment of successful command completion. The controller is responsible for ensuring that all command preconditions are met. Illegal commands result in undefined operation.

It should be noted that commands may take a variable amount of time to execute. Due to the internal queue management function, the time between a read command issue and the start of data is not deterministic.

VIII. Commands Associated with Reading Packets from PBRAM

A "read" command can be issued to a PBRAM 62 in order to read data stored therein. Referring to FIG. 13, the command specifies the port to send the data to, the queue identifier to read the packet from, and can optionally request a selected data format. For example, the read command can include parameters that request that the returned data include the packet tag value and packet length or simply the packet data (i.e. if packet data is not requested then the read command returns only the packet tag value and packet length). The read command can further include a parameter that requests that the packet is removed from the head of the queue it was stored on, after the data is returned. Lastly, the read command can further include a parameter that aborts a previous read operation that is still in progress.

The read command requests that packet data for the packet at the head of the selected queue be returned through one of the I/O ports. The selected port must not be in use for a write operation. The latency between an issued read command and the start of packet data will be bounded, but is currently unspecified. If the "abort" flag is set and a previous read operation is still in progress, then the previous read operation will be aborted. In this case, PBRAM will generate an EOP indication to separate the previous packet data from the current packet data. If the abort flag is not set, then the read command will execute immediately after the current read command completes. At most one read command may be buffered ahead in this manner. If the aborted read command had its "free" flag set, then the packet will be lost.

If the controller wishes to preserve a packet despite the possibility of its transfer being aborted, then it should not use the "free" flag. Rather, the "drop data" command should be used to dequeue the packet after it has been properly received. If the "free" flag is set, then the packet will be dequeued from the queue after successful delivery. If the free flag is not set, then the packet will remain queued to the head of the requested queue. If the "peek" flag is set, then only the packet length and tag data will be returned. If the peek flag is not set, then the entire packet data will be returned, prefixed with the length and tag information. If the selected queue is empty, then PBRAM will generate an immediate EOP indication on the read channel.

Referring to FIG. 14, a "suspend output" command can be issued to a PBRAM 62 in order to temporarily suspend packet output. The suspend-output command is used to transmit data over networks that employ bit-stuffing (as described above) or flow-control. When operating in conjunction with such networks, it is necessary to suspend the output from PBRAM 62 temporarily such that proper synchronization may be maintained. The command specifies the port that is to be suspended as well as the number of bits to be ignored before packet transmission is resumed. PBRAM 62 will output the "no data" indication on the DQ 70a and DQM 70b signals while packet output is suspended.

The "suspend output" command causes read data being output on a port to be suspended. If the "F" bit is a "1", then output to the given port is suspended indefinitely. If the "delay" value is zero, then output to the port resumes normally. This option is used to resume output after a "suspend output" command with F=1. If the "delay" value is between 1 and 31 inclusive, then output on the port is suspended for "delay" clock cycles, after which it automatically resumes. PBRAM will drive the DQM pin high and the DQ pin low while output is suspended.

This command is useful for applications where network output may occur at a variable bit rate. For example, the HDLC protocol used for synchronous serial transmission makes use of "bit-stuffing" to avoid certain bit patterns in the signal. Each bit-stuffing operation delays the output of the data by one bit. If sufficient delays are incurred, then data output from PBRAM may overrun the controller. The "suspend output" command is used in these cases to flow-control the read data so that this overrun does not occur.

IX. Commands Associated with Writing Packets to PBRAM

Figure 15:
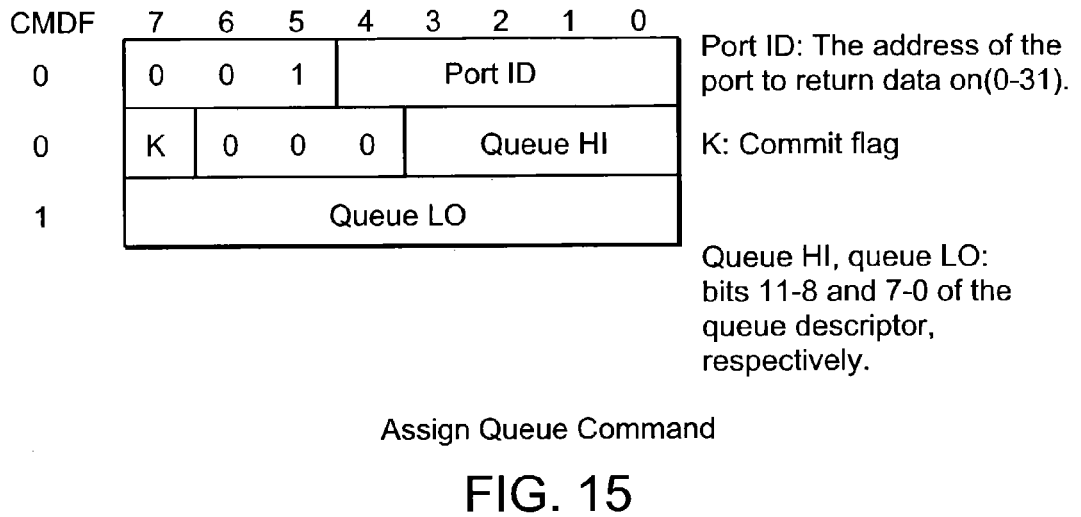
FIG. 15 depicts the structure of the Assign Queue Command that can be executed on the PBRAM device of FIG. 7.

Writing a packet into PBRAM 62 is initiated by either issuing a write command to that PBRAM 62, or by starting to write data into one of the I/O ports. Writing data into an I/O port, before issuing a write command, is useful for quickly responding to network traffic. The network controller is permitted to transmit up to 256 bits of data to PBRAM 62 before an associated write command is issued. A packet write command specifies the packet length, tag (optional) and queue to append the data to. Each of these may be specified as separate commands since correct values may not be known at the time a packet arrives. Accordingly, the "assign queue" command (see FIG. 15) specifies the I/O port over which data is arriving, and the queue(s) to append the data to. The "assign queue" command assigns the packet currently being written to one of the 4096 queues. This command is most efficient if it is issued within 256 bit times of the start of the packet.

Figure 16:
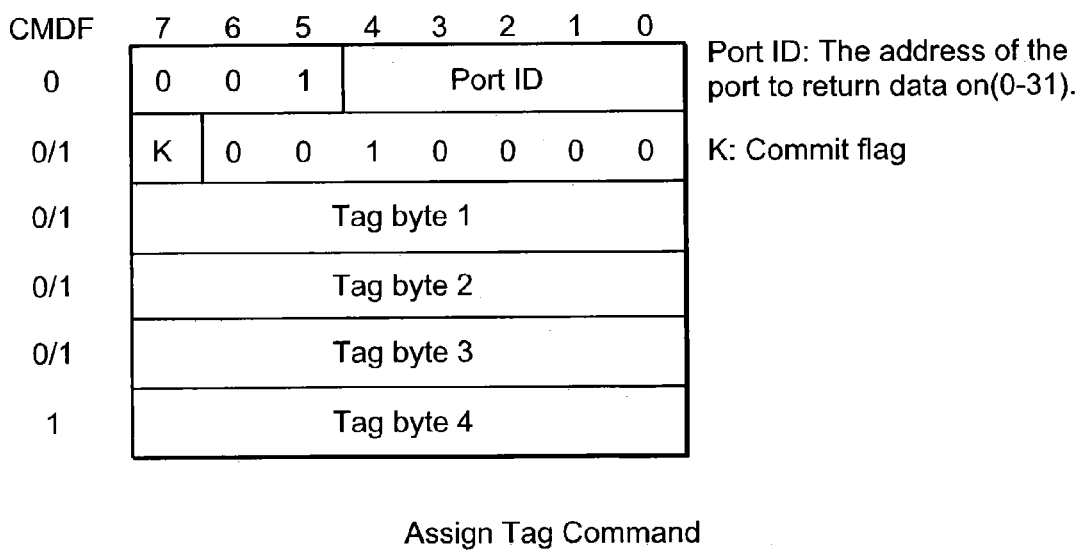
FIG. 16 depicts the structure of the Assign Tag Command that can be executed on the PBRAM device of FIG. 7.

Referring now to FIG. 16, the "assign tag" command specifies the I/O port over which the data is arriving, and the tag data to assign to the packet. The "assign tag" command assigns a tag value to the incoming packet. This command is vanable-length. Anywhere from one to four tag bytes may follow the command word. The number of bytes that follow must match the length of the tag field configured at system start-up. The CMDF pin must be low for each of the command bytes except for the last.

Figure 17:
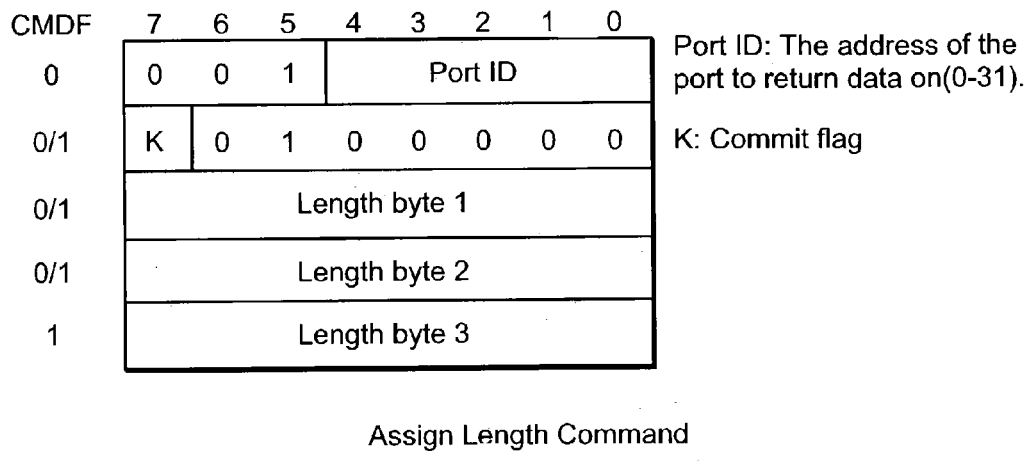
FIG. 17 depicts the structure of the Assign Length Command that can be executed on the PBRAM device of FIG. 7.

The "assign length" command (see FIG. 17) specifies the length of the packet. If this command is issued the PBRAM 62 will perform the write operation immediately upon receipt of the last data bit of the packet. Alternatively, an end-of-packet indication can be applied to the input pins DQ 70a and DQM 70b to denote the end of the packet. The assign length command may be useful for protocols such as ATM where cells can appear in a so called back-to-back manner between which there is no space to place an end-of-packet signal.

The "assign length" command sets the packet length. This command is useful when receiving gapless input data. The current write command will complete automatically upon receipt of the specified amount of data. This command must be issued sufficiently far in advance of the actual end of the packet. The minimum time interval between the issue of this command and the end of packet is currently unspecified. If the commit flag is set, then any subsequent write commands will apply to the following packet. Otherwise, write commands will continue to apply to the current packet, so that the tag and queue may be set. This command is variable-length. Anywhere from one to three length bytes may follow the command word. The number of bytes that follow must match the length of the packet length field configured at system start-up. The CMDF pin must be low for each of the command bytes except for the last.

A write operation is started by writing data to the I/O port. Data transfer may proceed even before a write command is issued. It is also permissible to start writing a new packet before completing all write commands for the previous packet. In this case, the previous packet must be committed before 256 bits of the current packet have been received. The "assign queue" and "assign tag" commands have a "commit" flag. If this flag is set, then the command completes the current write. If the flag is not set, then the command is not completed; further write commands may be used to communicate additional options. All writes must be committed eventually. Each write command may be issued at most once for any given packet. If a write command is issued more than once for a packet, the results are undefined.

Figure 18:
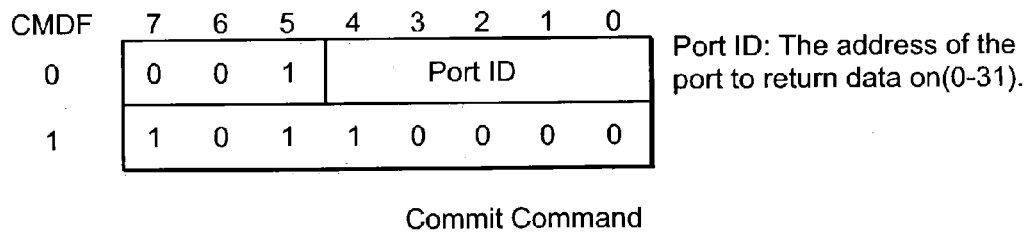
FIG. 18 depicts the structure of the Commit Command that can be executed on the PBRAM device of FIG. 7.

Referring to FIG. 18, the "write commit" command indicates that no more attributes (length, tag, queue) are to be assigned, and that no more data will arrive. The packet may thereafter be written into the DRAM memory array 74. It is used to indicate the end of packet data once all other write options have been given.

Figure 19:
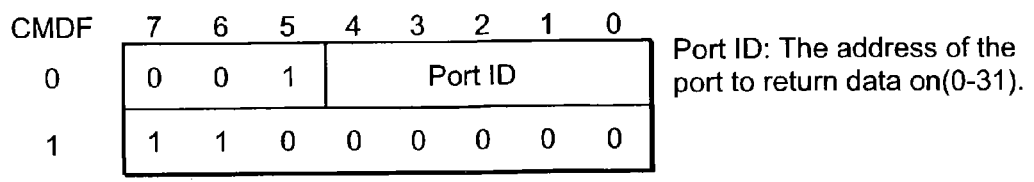
FIG. 19 depicts the structure of the Write Abort Command that can be executed on the PBRAM device of FIG. 7.

Referring now to FIG. 19, the "write abort" command aborts a write operation that is currently in progress. After a write abort command is issued, PBRAM 62 will wait until the indicated length is reached, or an end-of-packet signal is received. Data received up to that point is discarded and PBRAM 62 will begin acquiring data for the next packet.

Referring now to FIG. 20, the "transfer" command transfers data from one queue to one or more other queues. The command specifies the source queue and one or more destination queues. Optionally, the command can indicate that the packet is to be de-queued from the source queue. More particularly, this command transfers one packet from the head of the source queue to the tail of the destination queue. If the head queue is empty, then this command has no effect. It is illegal to transfer a packet that is currently being read, and whose "free" flat is set. This command has execution time independent of the length of the length of the packet being transferred.

The "drop data" command (see FIG. 21) is used to remove data from a specified queue. The packet at the head of the lowest-priority sub-queue is de-queued and freed. This command is useful to free data in an emergency if the PBRAM system is nearly filled to capacity.

The "flush queue" command (see FIG. 22) de-queues all data that has previously been queued on a specified queue. That command is issued in response to serious unexpected events, such as the failure of a network interface. In that situation, any data queued to the interface should be discarded and the resulting free memory space used to buffer traffic that is arriving from other I/O ports.

The "reset" command (see FIG. 23) resets the chip and causes all of the data queues to be emptied. This command causes all I/O operations to cease. Any write commands in progress are aborted. The QS and QSC outputs of each chip are disabled. If the "R" bit is zero, then data in the queue is not lost. If the "R" bit is one, then all data is cleared from the chip.

The "No Operation" command (see FIG. 24) causes the command bus to be placed in a particular state when no command is being issued.

The "test" command (see FIG. 25) puts the chip into a number of different test modes. The exact nature of the test modes is unspecified.

The "set chip count" command (see FIG. 26) informs each chip of the total number of PBRAM devices 62 in the system. Based on this information, each PBRAM 62 can determine the extent to which packets are interleaved across the PBRAM devices 62. This command sets the number and size of the buffers on the PBRAMs. Each buffer is 32*"Buffer size" bytes in length. There will be a total of $2^{\wedge}(18+\text{buffer count})$ buffers in the system. The sum of "Buffer size" and "buffer count" must equal the base-2 log of the number of PBRAM chips in the system.

The "set tag length" command (see FIG. 27) configures the number of bytes used to convey both the packet length and the packet tag. Typically, a packet length can be stored in two bytes, but if a packet exceeds 65535 bytes in length, then three bytes will be required. The length of the packet tag depends on the controller. The present embodiment of PBRAM 62 supports tags having from zero to four bytes of information. If the "E" bit is set, then PBRAM will generate an EOP signal after every successful packet read. If the "E" bit is not set, then no EOP will be issued.

The "timing reference" command (see FIG. 28) requests that a PBRAM 62 transmit its return clock on either the QS 71b or QSCAL 71c signal. The command specifies both the ID number of the chip that is requested to perform the operation and the port group number (0-3) for which to generate the related timing information.

If the "QS" bit is set, then the selected chip will output the return clock on the QS pin corresponding to the selected port. Otherwise, the QS pin for the selected port will be tri-state. If the "QSC" bit is clear, then the QSCAL pin for the selected port will be tri-state. Otherwise, if the "ENC" bit is set, then the selected chip will output its return clock on the QSCAL pin corresponding to the selected port. If the "ENC" bit is clear, then the QSCAL pin will be held low. Each port set is calibrated by having one of the PBRAMs output its QS as a reference. The QS pins on all other chips should be tri-state. Next, another PBRAM is instructed to output its echo clock on QSCAL. The controller may then make phase measurements and adjust the veniers as required. In normal operation, exactly one QS pin should be running for each port. The QSCAL pin should be held low by setting "ENC" and "QSC" on one part. All other chips should hold their QS and QSC pins tri-state.

The "vernier adjust" command (see FIG. 29) adjusts the phase offset generated by the DLL on each chip for each port group. The phase may be set in ⅟₃₂ clock period increments.

These last two commands differ from other commands in that they specify the ID of the PBRAM 62 that is to perform the related operation. All other commands are acted upon by all PBRAMs 62 that are configured in the system.

Finally, the "port configuration" command specifies how a port group is to operate. For example, this command sets the operation to be SDR or DDR mode and optionally aggregates two, four or all eight ports to form one or more high-speed ports, as previously described.

What is claimed is:

1. A packet buffer random access memory (PBRAM) device, comprising:
    (a) a memory array divided into a plurality of banks;
    (b) a plurality of input ports to be coupled to a network controller device, the memory array for storing packet data received by the plurality of input ports being shared by the plurality of input ports;
    (c) a plurality of serial registers each associated with a different one of the plurality of input ports, each of the serial registers configured for receiving packet data from the associated input port at a segment of a serial register concurrent with writing other packet data to the memory array from another segment of the serial register, each of the serial registers further being segmented into a plurality of segments, segments of respective serial registers being associated with corresponding portions of the memory array, segments of different serial registers simultaneously transferring packet data to different portions of the memory array;
    (d) row and column circuitry at each of the plurality of banks, the row and column circuitry configured to enable said writing other packet data to a respective bank independent of operation at other banks; and
    (e) a plurality of multiplexers each associated with a different one of the segments of the serial registers, each multiplexer enabling said writing other packet data to the memory array from a respective segment of the serial register.

2. The PBRAM device of claim 1 wherein packet data is transferred into one segment of a serial register as data is simultaneously transferred out of another segment of the serial register.

3. The PBRAM device of claim 1 wherein a portion of the memory array is a queue.

4. The PRAM device of claim 3 wherein the queue includes a plurality of sub-queues, each sub-queue assigned a priority level.

5. The PBRAM device of claim 4 wherein packet data is read from the sub-queue with the highest priority level that stores data.

6. The PBRAM device of claim 1 wherein the memory array is a single global memory.

7. A method for storing data packets transferred across a computer network in a packet buffer random access memory (PBRAM) device, the method comprising:
    receiving a plurality of data packets from controllers coupled to said computer network at a plurality of input ports of the PBRAM device;

serially transferring portions of the data packets to different segments of serial registers that are connected between the input ports and a memory array divided into a plurality of banks, each of the serial registers being associated with a different one of the input ports, the memory array for storing packet data received by the input ports being shared by the plurality of input ports;

selecting at least one of the plurality of banks to receive the portions of the data packets independent of other banks of the plurality of banks; and conveying the portions of the data packets from one of the serial registers to different portions of the memory array in parallel, while concurrently transferring other portions of the packets to other segments of the one of the serial registers, said conveying including multiplexing the portions of the data packets from respective segments of the serial registers onto a data bus.

8. The method of claim 7 wherein a portion of the memory array is a queue.

9. The method of claim 8 wherein the queue includes a plurality of sub-queues, each sub-queue assigned a priority level.

10. The method of claim 9 wherein packet data is read from the sub-queue with the highest priority level that stores data.

11. The PBRAM device of claim 7 wherein the memory array is a single global memory.

12. A packet buffer random access memory (PBRAM) device comprising:

a memory array divided into a plurality of banks;

a plurality of input ports coupled to the memory array by serial registers for conveying data to the memory array, each of the serial registers being associated with a different one of the input ports and configured for receiving packet data from the associated input port to a segment of a serial register concurrent with writing other packet data to the memory array from another segment of the serial register, the memory array for storing packet data received by the plurality of ports being shared by the plurality of input ports;

row and column circuitry at each of the plurality of banks, the row and column circuitry configured to enable said writing other packet data to a respective bank independent of operation at other banks;

a plurality of multiplexers each associated with a different one of the segments of the serial registers, each multiplexer enabling said writing other packet data to the memory array from a respective segment of the serial register;

a plurality of command ports for receiving commands that indicate desired operations to be performed in relation to the data conveyed on the input ports; and a memory management unit coupled between the command ports and the memory array, said memory management unit establishing input queue structures within the memory array responsive to write commands issued on the command ports, the input queue structures for receiving pointers to locations in a packet table that point to the data that is conveyed from the input ports.

13. The PBRAM device of claim 12 wherein the memory array is a single global memory.

14. An apparatus for storing packets transferred across a computer network in a packet buffer random access memory (PBRAM) device, comprising:

means for receiving a plurality of packets from controllers coupled to said computer network by a plurality of input ports of the PBRAM device;

means for assigning input queue structures, contained in a memory array portion of the PBRAM device divided into a plurality of banks, to store packets, the memory array being shared by the plurality of input ports;

means for serially transferring portions of the packets to different segments of serial registers that are connected to the input ports and to the memory array, each of the serial registers associated with a different one of the input ports;

means for selecting at least one of the plurality of banks to receive the portions of the packets independent of other banks of the plurality of banks;

means for conveying the portions of the packets from a segment of a serial register to the memory array portion in parallel, concurrent with receiving other packet data to another segment of the serial register, said means for conveying including means for multiplexing the portions of the packets from respective segments of the serial registers onto a data bus; and means for storing said packets in said queue structures, said queue structures being further accessible by a plurality of output ports of said PBRAM device such that said input queue structures become output queue structures that deliver the packets to associated output ports.

15. The apparatus of claim 14 wherein an output queue structure includes a plurality of sub-queues, each sub-queue assigned a priority level.

16. The apparatus of claim 15 wherein packet data is read from the sub-queue with the highest priority level that stores data.

17. The PBRAM device of claim 14 wherein the means for storing is a single global memory.

* * * * *

UNITED STATES PATENT AND TRADEMARK OFFICE
CERTIFICATE OF CORRECTION

PATENT NO. : 7,675,925 B2  Page 1 of 1
APPLICATION NO. : 10/614558
DATED : March 9, 2010
INVENTOR(S) : David E. Jones It is certified that error appears in the above-identified patent and that said Letters Patent is hereby corrected as shown below:

In Column 16, Claim 4, line 54 delete "PRAM" and insert -- PBRAM --
In Column 17, Claim 11, line 25 delete "PBRAM device" and insert -- method --
In Column 18, Claim 17, line 48 delete "PBRAM device" and insert -- apparatus --

Signed and Sealed this
Nineteenth Day of March, 2013

Teresa Stanek Rea
*Acting Director of the United States Patent and Trademark Office*